United States Patent
Lecoq et al.

(10) Patent No.: US 8,275,940 B2
(45) Date of Patent: Sep. 25, 2012

(54) METHOD AND DEVICE FOR OPTIMISATION OF THE MANAGEMENT OF A SERVER CACHE WHICH MAY BE CONSULTED BY CLIENT TERMINALS WITH DIFFERING CHARACTERISTICS

(75) Inventors: Elouan Lecoq, Rennes (FR); Julien Perron, Rennes (FR)

(73) Assignee: Streamezzo, Paris (FR)

( * ) Notice: Subject to any disclaimer, the term of this patent is extended or adjusted under 35 U.S.C. 154(b) by 785 days.

(21) Appl. No.: 11/912,024

(22) PCT Filed: Mar. 27, 2006

(86) PCT No.: PCT/EP2006/061062
§ 371 (c)(1),
(2), (4) Date: May 27, 2008

(87) PCT Pub. No.: WO2006/111452
PCT Pub. Date: Oct. 26, 2006

(65) Prior Publication Data
US 2008/0288722 A1 Nov. 20, 2008

(30) Foreign Application Priority Data
Apr. 19, 2005 (FR) ..................... 05 03902

(51) Int. Cl.
*G06F 12/00* (2006.01)
(52) U.S. Cl. ......... 711/118; 711/130; 709/203; 709/226
(58) Field of Classification Search .................. 711/130, 711/118; 709/203, 226
See application file for complete search history.

(56) References Cited

U.S. PATENT DOCUMENTS

| | | | |
|---|---|---|---|
| 7,024,452 B1 * | 4/2006 | O'Connell et al. | 709/203 |
| RE39,184 E * | 7/2006 | Schloss et al. | 711/122 |
| 7,155,681 B2 * | 12/2006 | Mansour et al. | 715/762 |
| 7,360,025 B1 * | 4/2008 | O'Connell et al. | 711/133 |
| 2002/0073238 A1 * | 6/2002 | Doron | 709/246 |

(Continued)

FOREIGN PATENT DOCUMENTS

| EP | 1207463 A2 | 5/2002 |
|---|---|---|
| WO | WO 01/86511 | 11/2001 |

OTHER PUBLICATIONS

Written Opinion dated Apr. 19, 2005 from counterpart foreign application No. PCT/EP2006/061062 filed Mar. 27, 2006.

(Continued)

*Primary Examiner* — Arpan P. Savla
(74) *Attorney, Agent, or Firm* — Zilka-Kotab, PC (57) ABSTRACT

A method is provided for optimization of the management of a server cache for dynamic pages, which may be consulted by client terminals with differing characteristics which requires the provision of discrete versions of a dynamic page in the cache. When a terminal requests a dynamic page, a verification step—for the presence of at least one version of the dynamic page in the cache is carried out, such that if the verification is positive the following complementary steps are carried out: procurement of a set of characteristics specific to the type of client terminal, determination of a subset of necessary characteristics from amongst the specific characteristics for the reproduction of the dynamic page on a client terminal, search, among the version(s) of the dynamic page in the cache for a suitable version using the subset of necessary characteristics and allocation of the suitable version to the client terminal.

14 Claims, 10 Drawing Sheets

U.S. PATENT DOCUMENTS

| | | | |
|---|---|---|---|
| 2003/0050973 A1* | 3/2003 | Tracton et al. | 709/203 |
| 2003/0177269 A1* | 9/2003 | Robinson et al. | 709/246 |
| 2004/0003117 A1 | 1/2004 | McCoy et al. | 709/246 |
| 2007/0101061 A1* | 5/2007 | Baskaran et al. | 711/118 |

OTHER PUBLICATIONS

Fielding, R. et al., RFC 2068—Hypertext Transfer Protocol—HTTP/1.1, Jan. 1997, pp. 1-131, retrieved from http://www.faqs.org/rfcs/rfc2068.html on May 18, 2011.

* cited by examiner

METHOD AND DEVICE FOR OPTIMISATION OF THE MANAGEMENT OF A SERVER CACHE WHICH MAY BE CONSULTED BY CLIENT TERMINALS WITH DIFFERING CHARACTERISTICS

CROSS-REFERENCE TO RELATED APPLICATION

This Application is a Section 371 National Stage Application of International Application No. PCT/EP2006/061062, filed Mar. 27, 2006 and published as WO 2006/111452 A1 on Oct. 26, 2006, not in English.

FIELD OF THE DISCLOSURE

The field of the disclosure is that of content server terminals, e.g., for multimedia content, capable of being accessed via client terminals having heterogeneous characteristics.

More precisely, the disclosure relates to improving and optimising the management of the cache service of such a content server terminal, based on the characteristics specific to the client terminal requesting one or more instances of a predetermined content from the server terminal.

BACKGROUND

Solutions are known from the prior art which aim to index the cache of a server terminal by the address of the client terminal on the underlying communication network.

A first known technique of the prior art consists in indexing the cache of the server terminal by the URL (Uniform Resource Locator) address.

This technique, which is well described in the RFC 2068 of the http 1.1 standard (http://www.faqs.org/rfcs/rfc2068.html), has the primary disadvantage of not allowing consideration of a mixed population of client terminals requiring content suited to their specific characteristics (screen size, memory, etc.). Consequently, cached content will be returned in the same state following any request coming from client terminals requesting the same content page URL address on the server, which makes this http cache mechanism particularly unsuitable and therefore unusable within the context of the invention, which, as a matter of fact, aims to take account of the characteristics specific to each client terminal in order to adapt and return the requested content in a form better suited to the technical constraints of the client terminal.

Another known technique of the prior art proposes to index the cache of the server terminal by the URL address (Uniform Resource Locator) and by the characteristics of the client terminal at the origin of a content request from the server. This technique translated in Section 14.43 of the RFC 2068 defining the http 1.1 standard (http://www.faqs.org/rfcs/rfc2068.html) cannot also be applied to the problem solved by the invention, in the sense that it would require the client terminal at the origin of a dynamic content request to be in a position to transmit all of its characteristics on different lines of the http header of its request bound for the server terminal. Such being the case, no client terminal on the market is in a position to propose such a relatively disadvantageous approach, because it would therefore require being able to control implementation of the transmission of the characteristics to the server terminal by the client terminal, which the technique according to the invention actually seeks to avoid through the genericity of the proposed solution.

Furthermore, according to the prior art, such a technique would require the technical criteria or characteristics of the client terminals to be fixed or for the combinations of client terminal criteria to be duplicated at the start of content generation.

Another disadvantage of the http standard is linked to the fact that it requires advance knowledge of the parameters to be put into the cache of the server terminal, for a given type of client terminal at the origin of a request for a page or, more generally speaking, for dynamic content.

SUMMARY

An aspect of the disclosure relates to method for optimising the management of a dynamic page server cache capable of being consulted via different types of client terminals, and consequently requiring distinct instances of a dynamic page in the cache. Such a method according to the invention is advantageously such that, when a terminal requests a dynamic page, it implements a step for verifying the presence of at least one instance of the dynamic page in the cache, whereby if the verification is positive, the following additional steps are implemented:
procurement of a set of characteristics specific to the type of client terminal;
determination, from amongst the specific characteristics, of a subset of characteristics necessary for rendering the dynamic page on a client terminal;
searching for a possible instance amongst the instance(s) of the dynamic page in the cache, using the subset of necessary characteristics;
allocation of the possible instance to the client terminal.

According to an embodiment of the invention, an approach such as this makes it possible, in particular, to consider an embodiment in which a server terminal already has a set of preloaded dynamic pages for certain types of client terminals with known characteristics.

If the verification is negative, the following additional steps are advantageously implemented:
generation of at least one instance of the dynamic page in the cache for a subset of characteristics specific to the type of client terminal;
allocation of the generated instance to the client terminal.

The cache is preferably in the form of a table including, for each address of a dynamic page, at least one first list of entries containing at least one characteristic specific to the client terminal, and at least one second list of entries containing, for at least one of the characteristics of the first list, at least one valid cache value necessary for rendering a dynamic page on the client terminal.

An approach such as this proves to be very effective in the sense that it does not require advance knowledge of the set of technical characteristics of a client terminal to be taken into account in order to generate the content requested by the latter.

Thus, by way of example, the following situation can be cited, in which a client terminal requests a dynamic video content from a server terminal. Following the request from the client terminal, one then looks in the first list to see if the characteristic of the client terminal, referenced C1, for example, and corresponding to "supports the video" is present. If the response is negative, no particular processing is carried out. Conversely, in the case of a positive response, one looks in the second list to see if the characteristic "supports Mpeg-4" has a Boolean value equal to 1 (yes) or else 0 (no).

Preferably, the step for verifying the presence of at least one instance of the dynamic page in the cache includes the following substeps of:

searching to see if, for the address of the dynamic page requested by the client terminal, at least one of the characteristics of the subset of characteristics specific to the client terminal is present in the first list of cache entries;

and if at least one of the characteristics of the client terminal is found in the first list of entries:

searching to see if, for each of the characteristics of the subset of characteristics necessary for rendering the dynamic page requested by the terminal, there is at least one valid value in the second list of cache entries;

and, if for the address of the requested dynamic page none of the characteristics of the subset of characteristics specific to the client terminal is present in the first list of entries, or if the step for searching for at least one valid cache value in the second list of cache entries was without result in terms of the characteristics of the subset of characteristics necessary for rendering the dynamic page:

addition to the first list of entries of at least one characteristic of the subset of characteristics for the address of the dynamic page requested by the client terminal, and generation, in the second list of cache entries, of at least one valid cache value for at least one of the necessary characteristics of the subset of characteristics added to the first list.

The distinct instances of a dynamic page are advantageously accessible in the cache for a predetermined period of time.

Thus, assuming preloading of the contents of the dynamic pages into the cache of the server terminal, based on a set of technical characteristics specific to terminals fully identified previously, the time of persistence of the dynamic pages generated in the cache of the server terminal may be parametrized ad infinitum, for example.

Conversely, if the server terminal must be capable of generating dynamic pages for a very large diversity of client terminals the type of which is not known in advance, the time of persistence of the instances of the dynamic pages generated in the cache will be parametrized between a few hundred milliseconds and a few seconds or minutes.

The request for a dynamic page by a client terminal is advantageously taken into account by the dynamic page server after a preliminary positive identification step of the type of client terminal by the dynamic page server.

A preliminary step such as this makes it possible, in particular, to anticipate, in relation to caching in the server terminal, the characteristics of the client terminal which is seeking to be connected, the essential characteristics of the latter which will be necessary to the client terminal in order to generate the contents what will possibly be cached.

The characteristics of the subset of characteristics necessary for rendering a dynamic page on a client terminal are preferably determined directly by the server on the basis of the type of client terminal requesting the dynamic page from it.

In this embodiment, the client which is identified by the server terminal, and then the server terminal recognises the type of client terminal which is connected to it and which then determines the essential characteristics of the client terminal to be taken into account in order to generate the appropriate contents, these latter no longer necessarily being transmitted to the server terminal by the client terminal.

In an advantageous alternative embodiment of the invention, the characteristics of the subset of characteristics necessary for rendering a dynamic page on a client terminal are predetermined by the client terminal itself, which then transmits them directly in each of its requests to the dynamic page server. An alternative such as this enables any type of client terminal whose technical characteristics are not known in advance by the server terminal, to be capable nevertheless of requesting from the latter dynamic page content that is perfectly suited to it.

In an equally advantageous way, in another alternative embodiment of the invention, the client terminal transmits the characteristics of the subset of characteristics necessary for rendering a dynamic page on a predetermined hosting server terminal, and then transmits to the dynamic page server terminal the address of the hosting server in which the latter may come to look for the characteristics of the subset of characteristics specific to the client terminal.

Preferably, for each instance of the dynamic page generated, all of the values of the variables used by the generated page, and calculated on the basis of the subset of characteristics specific to the type of client terminal, are added to the cache.

The step for generating at least one instance of the dynamic page in the cache also preferably includes a preliminary substep for determining at least one characteristic and at least one value of the characteristic, which are essential for the generating step.

It is well-understood that, in certain cases, the cache can be used and/or parametrized so as to function like a customary cache, i.e., so that all of the pages requested by one or more terminals are cached for a predetermined period of time.

The dynamic pages are advantageously multimedia content pages including at least one piece of data of the type belonging to the group including at least:

text;
images;
sound;
video.

The client terminals are advantageously of different types belonging to the group including at least:

mobile telecommunication and/or radiocommunication terminals;
stationary terminals;
streaming terminals;
and the dynamic page server generating content is of the:
stationary server type;
mobile server type;
streaming server type.

It is specified here that a mobile server is understood to mean a mobile terminal capable of serving as a "light" content server, so that an authorised client terminal—a mobile telephone, for example—can be connected to it in order to retrieve shared data.

One fundamental objective of the method of an embodiment of the invention is to offer adaptability in the generating of content by the server terminal, irrespective of the type thereof and irrespective of the type of client terminal making its request for dynamic page content from this server terminal.

An embodiment of the invention also relates to a computer program including program instructions for optimising the management of a dynamic page server cache capable of being consulted by different types of client terminals, and consequently requiring distinct instances of a dynamic page within said cache.

A program such as this is such that, when a terminal requests a dynamic page, it advantageously executes a step for verifying the presence of at least one instance of the dynamic page in the cache of the server terminal, so that, if verification is positive, it executes the additional steps of:

procurement of a set of characteristics specific to the type of client terminal;
   determination, from amongst the specific characteristics, of a subset of characteristics necessary for rendering the dynamic page on a client terminal;
   searching for a possible instance amongst the instance(s) of the dynamic page in the cache, using the subset of necessary characteristics;
   allocation of the possible instance to the client terminal.

Furthermore, if verification is negative, this programme preferably executes the following steps of:

generation of at least one instance of the dynamic page in the cache for a subset of characteristics specific to the type of client terminal;
   allocation of the generated instance to the client terminal.

An embodiment of the invention also relates to a device for optimising the management of a dynamic page server cache being consulted by different types of client terminals, and consequently requiring distinct instances of a dynamic page within the cache.

A device such as this advantageously includes means for verifying the presence of at least one instance of the dynamic page in the cache when a client terminal requests a dynamic page, and:

means of procuring a set of characteristics specific to the type of client terminal;
   means of determining, from amongst the specific characteristics, a subset of characteristics necessary for rendering the dynamic page on a client terminal;
   means of searching for a possible instance amongst the instance(s) of the dynamic page in the cache, using the subset of necessary characteristics;
   means of allocating the possible instance to the client terminal.
   generating at least one instance of the dynamic page in the cache for the set of values of the subset of characteristics specific to the type of client terminal.

Thus, and also advantageously, if at least one instance of the dynamic page is present in the cache, the allocation means allocate the instance of the dynamic page to the client terminal requesting it and, if no instance of the dynamic page is present in the cache, the generating means generate at least one instance of the page requested in the cache for a subset of characteristics specific to the client terminal.

The scope of the device according to an embodiment of the invention is substantially equivalent to that described from a technical standpoint for the aforesaid method.

Finally, an embodiment of the invention also relates to a dynamic page server generating content advantageously including a device such as the aforesaid one, the role of which consists in ensuring optimisation of the management of at least one dynamic page server cache capable of being consulted by different types of mobile terminals, and consequently requiring distinct instances of a dynamic page within the cache.

An embodiment of the invention thus fits perfectly within a context of optimising the management of a server terminal cache for dynamically generated contents capable of being consulted by dissimilar clients identified by a set of characteristics, which consequently requires distinct instances of a given content within the cache.

In this way, and summarily, when a client requests a given content from a content server terminal, first the presence of at least one instance of the content in the cache is verified, and if this instance is present, a set of characteristics is obtained which is specific to the type of client at the origin of the request.

Next, a subset of characteristics necessary for rendering the content on the client at the origin of the request is determined from amongst the specific characteristics, and a possible instance is searched for amongst the instance(s) of the content which are available in the cache, using the subset of necessary characteristics, and this is the case even if this instance has been placed in the cache of the server terminal previously and for another client terminal. This instance is then transmitted or allocated to the client.

Conversely, if this instance is not present, an instance of the content is generated for the client terminal at the origin of the request, on the basis of a subset of characteristics of the requesting client terminal, which are identified as necessary for generating the instance and the transmission thereof to the client. It will be advantageously stated here that the subset of the characteristics necessary for transmitting the requested dynamic content to the requesting client terminal can vary with respect to the requested content and/or the type of client terminal itself.

Next, the dynamic content thus generated over a predetermined and configurable period is stored inside the cache, as well as the characteristics and necessary values of these characteristics specific to the client terminal, prior to transmitting and/or allocating the requested dynamic content instance to the client terminal.

Other characteristics and advantages will become more apparent upon reading the following description of a preferred embodiment of the invention, given for non-limiting and illustrative purposes, made in reference to the appended drawings.

DETAILED DESCRIPTION OF ILLUSTRATIVE EMBODIMENTS

Three preferred embodiments of the invention are presented in conjunction with the aforesaid figures.

Figure 1:
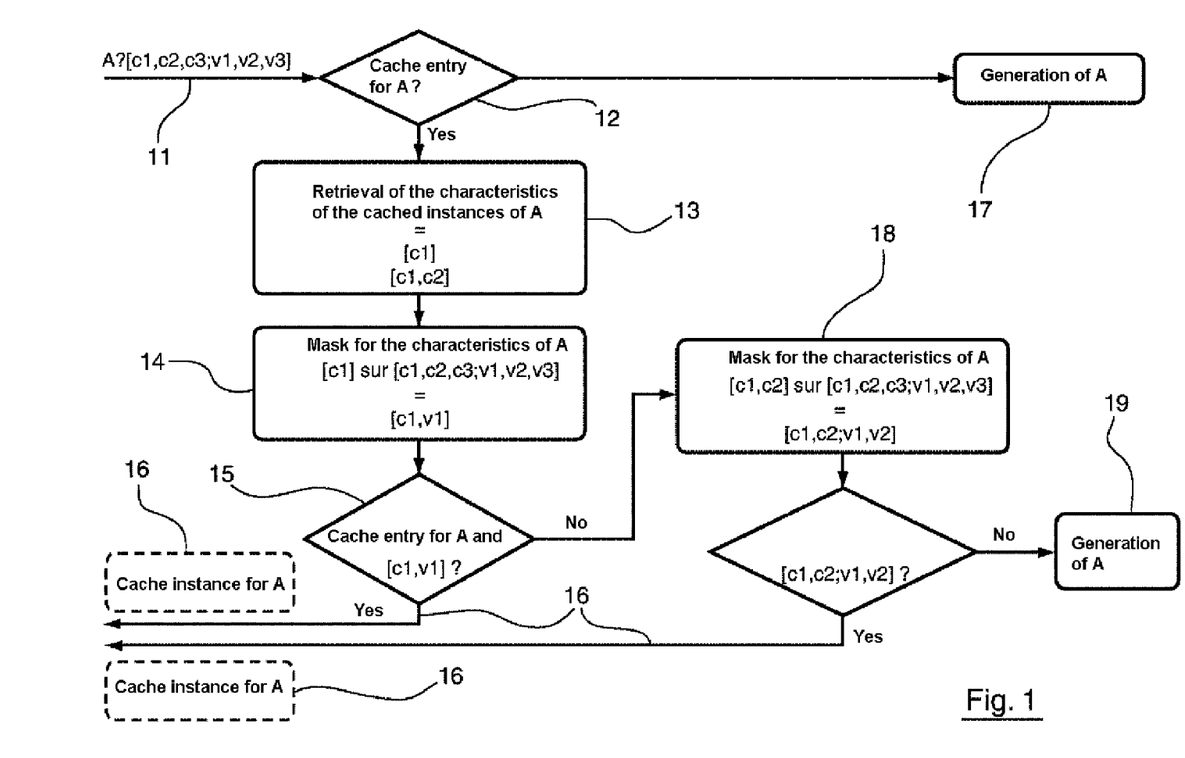
FIG. 1 is a flowchart of the choice logic for an instance in the cache with respect to the characteristics of the content and the type of client terminal.

As shown in FIG. 1, which presents a flowchart of the method for optimisation of the management of a dynamic page server cache according to an embodiment of the invention, when a terminal requests 11 a dynamic page, a step 12 is implemented for verifying the presence of at least one instance of the dynamic page in the cache, so that, if verification is positive, the additional steps are implemented:

of procuring 13 a set of characteristics specific to the type of client terminal;

of determining 14, from amongst the specific characteristics, a subset of characteristics necessary for rendering the dynamic page on a client terminal;

of searching 15 for a possible instance amongst the instance(s) of the dynamic page in the cache, using the subset of necessary characteristics;

of allocating 16 the possible instance to the client terminal (possibly by masking for the characteristics of A 18) and of generating 19 at least one instance of said dynamic page in said cache.

Furthermore, if said verification step 12 is negative, the additional steps are implemented:

of generating 17 at least one instance of said dynamic page in said cache for a subset of characteristics specific to the type of said client terminal;

of allocating said generated instance to said client terminal.

Figure 2:
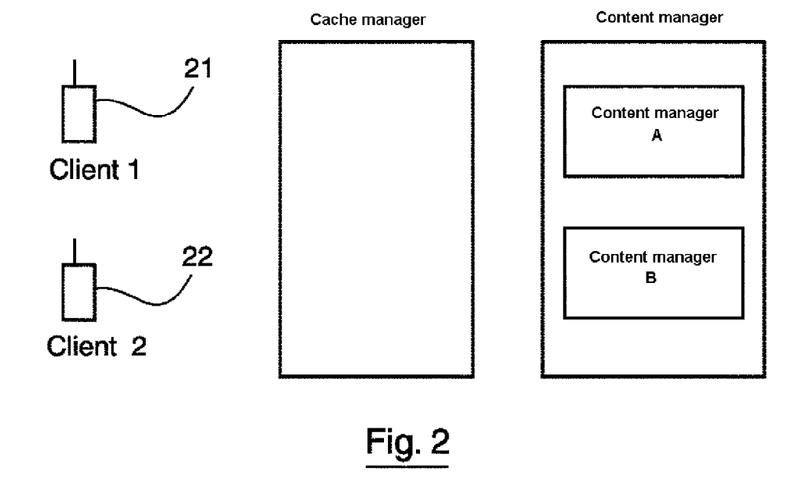
FIG. 2 shows the various components involved in the cache method according to an embodiment of the invention, in a configuration with two client terminals.

1. Description of the General Principle of the Mechanism for Managing the Cache of a Server Terminal According to an Embodiment of the Invention, for Two Similar Client Terminals As shown in FIG. 2, although different but with compatible characteristics, two clients 21, 22 will share the same cached content. In the following example, client 21 possesses the characteristics referenced C1, C2 and the values V1, V2 for these characteristics. Client 22 possesses the technical characteristics referenced C1, C3 and the values V1, V3 for these characteristics.

Figure 3:
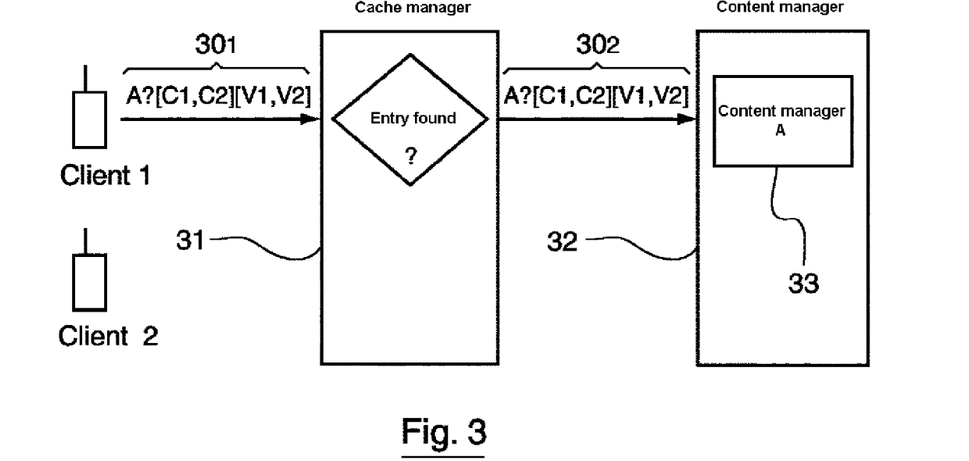
FIG. 3 shows the requesting mechanism between a client terminal and the content manager according to an embodiment of the invention.

In this configuration, and as shown in FIG. 3, client 21 requests content A from the server terminal, while at the same time transmitting in its request $30_1$, its characteristics C1, C2 and the values V1, V2 for these characteristics C1, C2.

It is specified here that the content server terminal within the meaning of an embodiment of the invention manages the cache and, in order to do so, includes two entities referred to as cache manager and content manager, the first one managing the instances of contents generated by the content manager.

The server terminal cache manager 31 looks to see if it possesses entries relating to the requested content A. In the case of FIG. 3, no entry relating to A can be found in the cache manager 31, the latter then transmitting the request 30.sub.2 to the content manager 32 of the server terminal, in order for it to generate the requested content A by means of a content manager 33.

Figure 4:
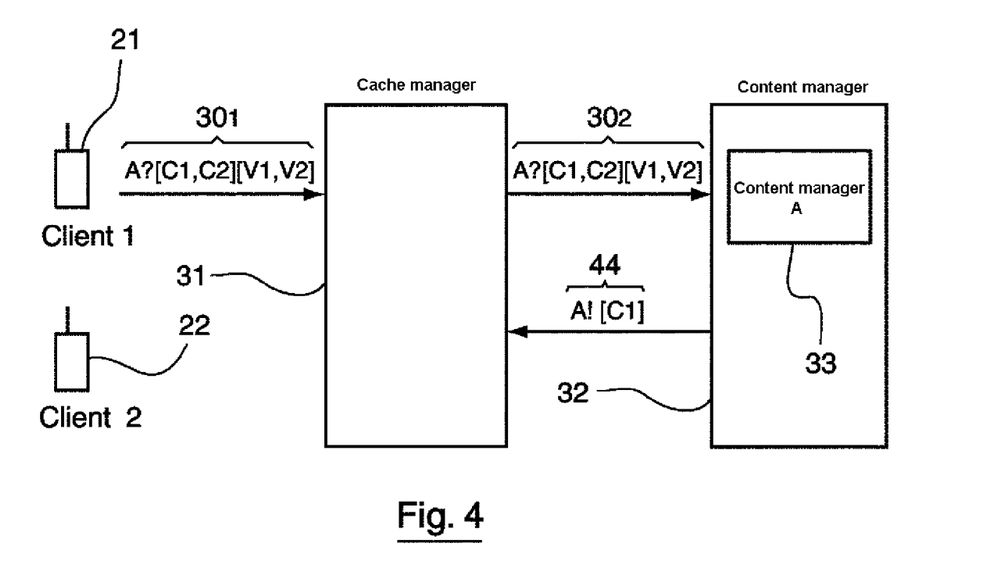
FIG. 4 is an example of the mechanism for generating content for a client terminal on the basis of a characteristic thereof.

The content manager 33 generates the requested content A after it has identified the characteristic C1 of the request 30.sub.2 for doing so, which is necessary for generating. It then sends the generation result back to the cache manager 44 in the form of a request, as shown in FIG. 4.

Figure 5:
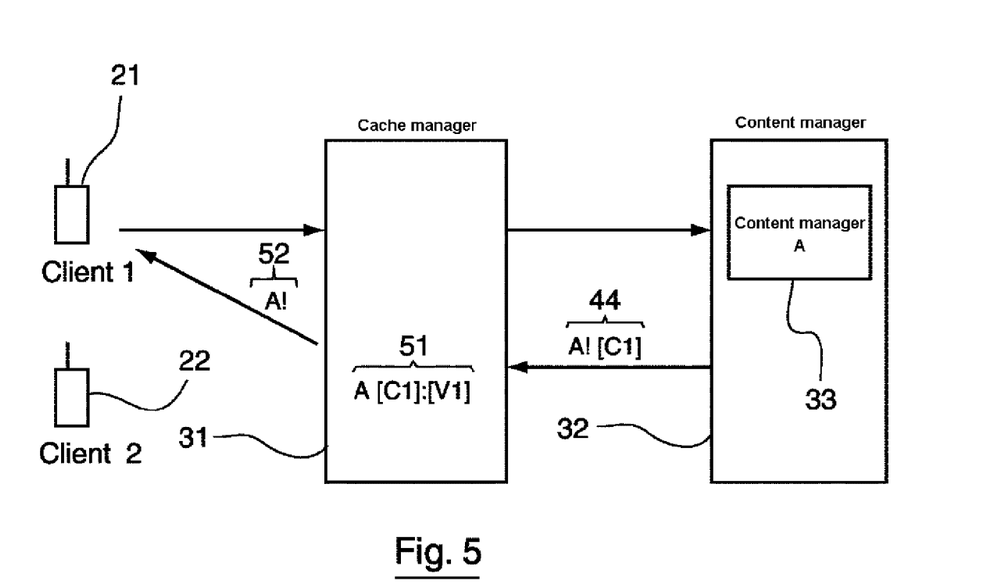
FIG. 5 shows the principle of caching content generated in FIG. 4 on the basis of a characteristic of the client terminal, and of transmitting the generated content to the client terminal.

As shown in FIG. 5, the cache manager 31 stores the content A 51 with the criterion C1 and retrieves the value V1 associated with C1 for this client 21. Then, it sends the content of the dynamic page A 52 back to the client 21 having requested it. The content 51 is then stored for a predetermined and parameterable period of time inside the cache manager of the server terminal.

Figure 6:
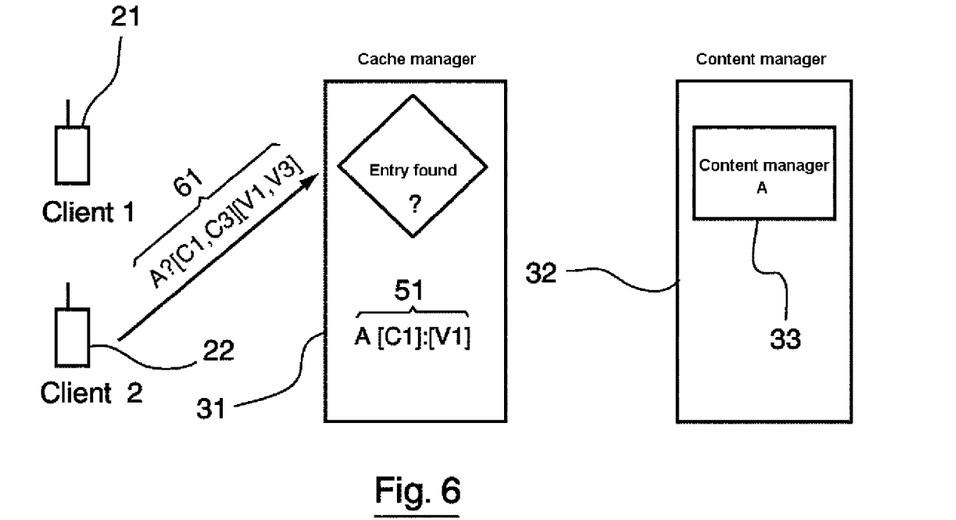
FIG. 6 gives an example of the principle of requesting via a second client terminal, when the cache of the server terminal is not empty.
Figure 7:
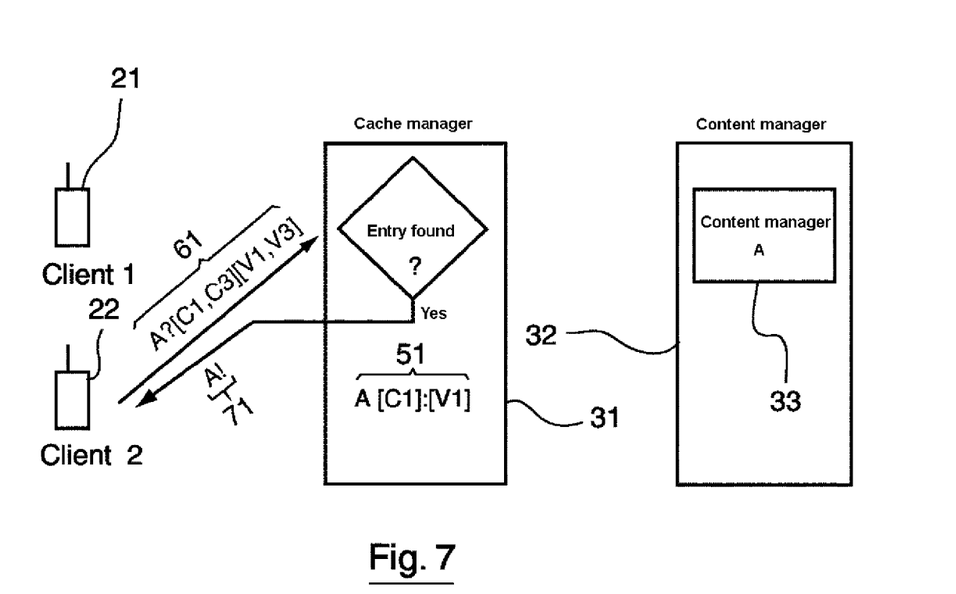
FIG. 7 shows the transmission of content by the server terminal when a requested instance is present in the cache thereof.

Subsequently, as shown in FIGS. 6 and 7, if the client 22 in its turn asks the server terminal for the content A, in the form of a request 61, the cache manager 31 looks to see if it has entries relating to A.

In the present situation of FIG. 6, the request 61 for content A includes the characteristics C1 and C3 and the values V1 and V3 for the latter, in connection with the client terminal 22. For this request 61, the manager 31 has found a compatible entry 51 that it then returns to the client terminal 22 in the form of a request 71. No new content was again generated for the request 61 of the client terminal 22. As a matter of fact, the cache manager 31 was capable of determining that for the client 22, just as for the client terminal 21, only the characteristic C1 associated with the value V1, the characteristic C3 and its value V3 as having no affect in terms of generating content for content A. As a result, the content manager 31 settles for returning to the client terminal 22 the content A 71, for which one instance 51 was able to be found.

Figure 8:
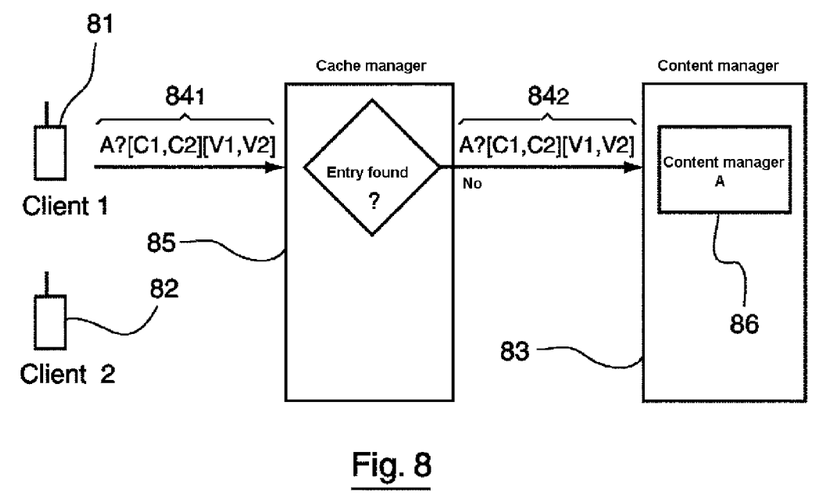
FIG. 8 gives an example of content generation by the server terminal and of determination by the latter of an essential characteristic of generating the content from amongst the characteristics transmitted by a client terminal.
Figure 9:
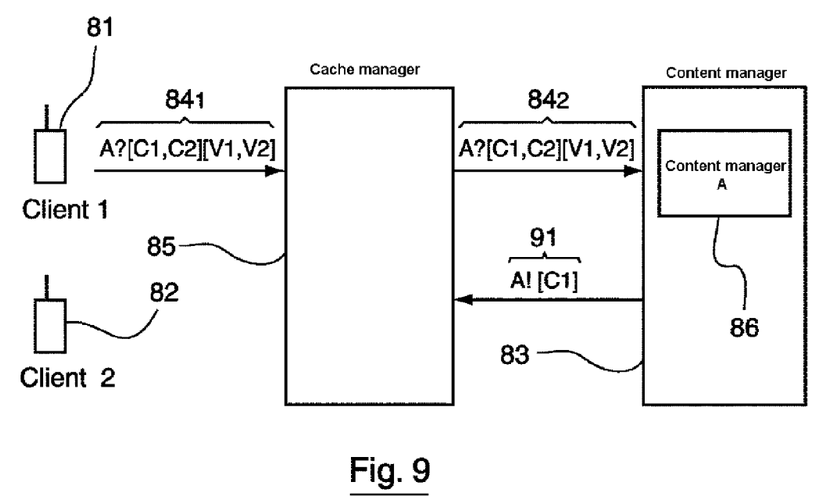
FIG. 9 gives an illustration of placing in the cache of the server terminal content generated for the example of FIG. 8.
Figure 10:
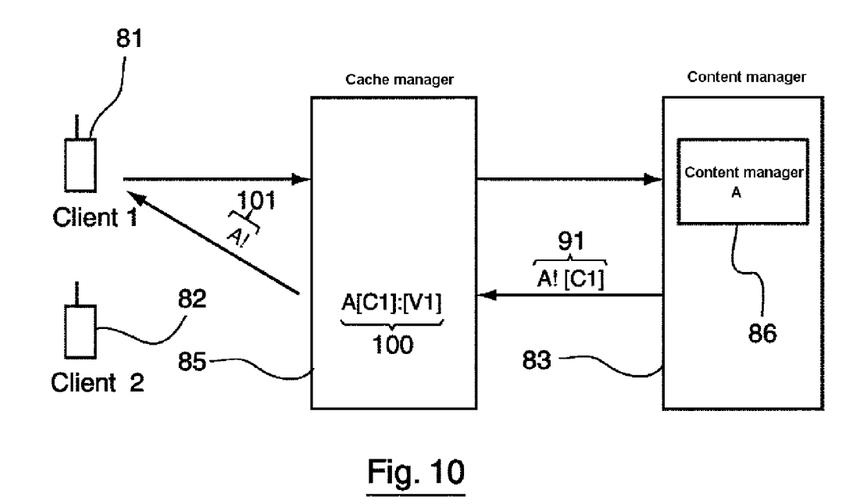
FIG. 10 gives an example of requesting from the server terminal by a second client terminal, when the cache is not empty, but when no instance can be found in the cache.

2. Description of the General Principle of the Mechanism for Managing the Cache of a Server Terminal According to an Embodiment of the Invention, for Two Characteristically Distinct Client Terminals As shown in FIGS. 8 to 10, the case of two different client terminals 81, 82 without any compatible characteristics will now be discussed. Such clients cannot therefore share the same cached content corresponding to contents generated on the basis of their respective technical characteristics and the values associated with these characteristics, respectively.

In this new configuration, the client 81 possesses the characteristics C1, C2 and the values V1, V2 for these characteristics C1, C2, whereas the client terminal 82 possesses characteristics C1 C2, but possible values V3, V2 for these characteristics, which are different from the values V1, V2.

Thus, and just as in the preceding configuration, as shown by way of FIGS. 8 to 10, the client 81 requests content A from a server terminal, while at the same time transmitting in its request $84_1$, its characteristics C1, C2 and the values V1, V2 for these characteristics C1, C2.

The server terminal cache manager 85 looks to see if it possesses entries relating to the requested content A. In the case of FIG. 8, as no entry relating to A was able to be found, the cache manager 85 then transmits the request 842 to the server terminal content manager 83 in order for it to generate the requested content A by means of a content manager 86.

The content manager 86 generates the requested content A after it has identified the characteristic C1 of the request 842 as being necessary for generating. It then sends the generation result back to the cache manager 85 in the form of a request 91, as shown in FIG. 9.

As shown in FIG. 10, the cache manager 85 stores the content A 100 with the criterion C1 and retrieves the value V1 associated with C1 for this client 21. Then, it sends the content of the dynamic page A 101 to the client 81 having requested it. The content 100 is then stored for a predetermined and parameterable period of time inside the server terminal cache manager.

Figure 11:
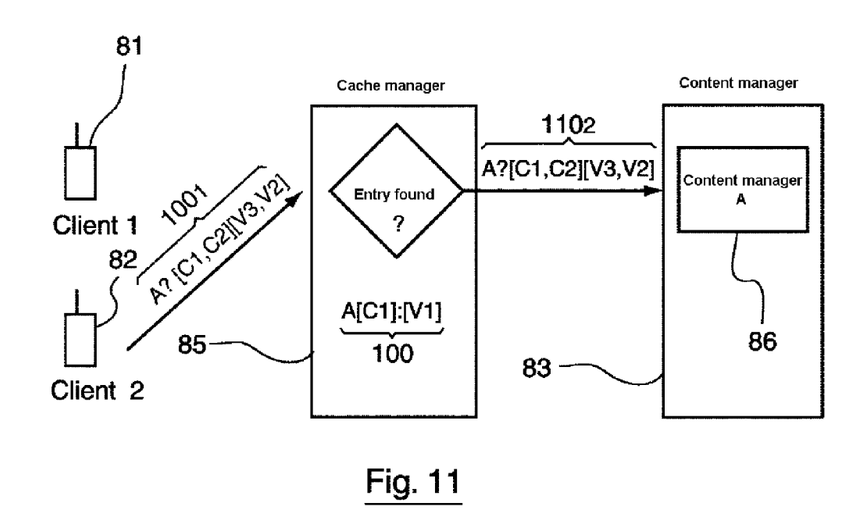
FIG. 11 shows the principle of generating a new cache instance when the server terminal does not already have the requested instance in its cache.

Next, as shown in FIG. 11, the client 82 in turn requests the same content A from the server terminal, as the client 81 had done previously, but this time by transmitting in its request 1101 its own characteristics C1 and C3 and the values V3 and V2 capable of being associated with them.

Again, the cache manager 85 looks to see if it has entries relating to A which are compatible with the request, i.e., compatible for generating A, with at least some essential C1 and/or C2 of the client terminal 82 and some possible values for these characteristics, respectively.

In the present case of FIG. 11, the cache manager 85 does not find any entry compatible with the request 110.sub.1 of the client terminal 82 and thus transmits to the server terminal content manager 83 a request 110.sub2 in order for the latter to generate the dynamic page content A requested by the client terminal 82.

Figure 12:
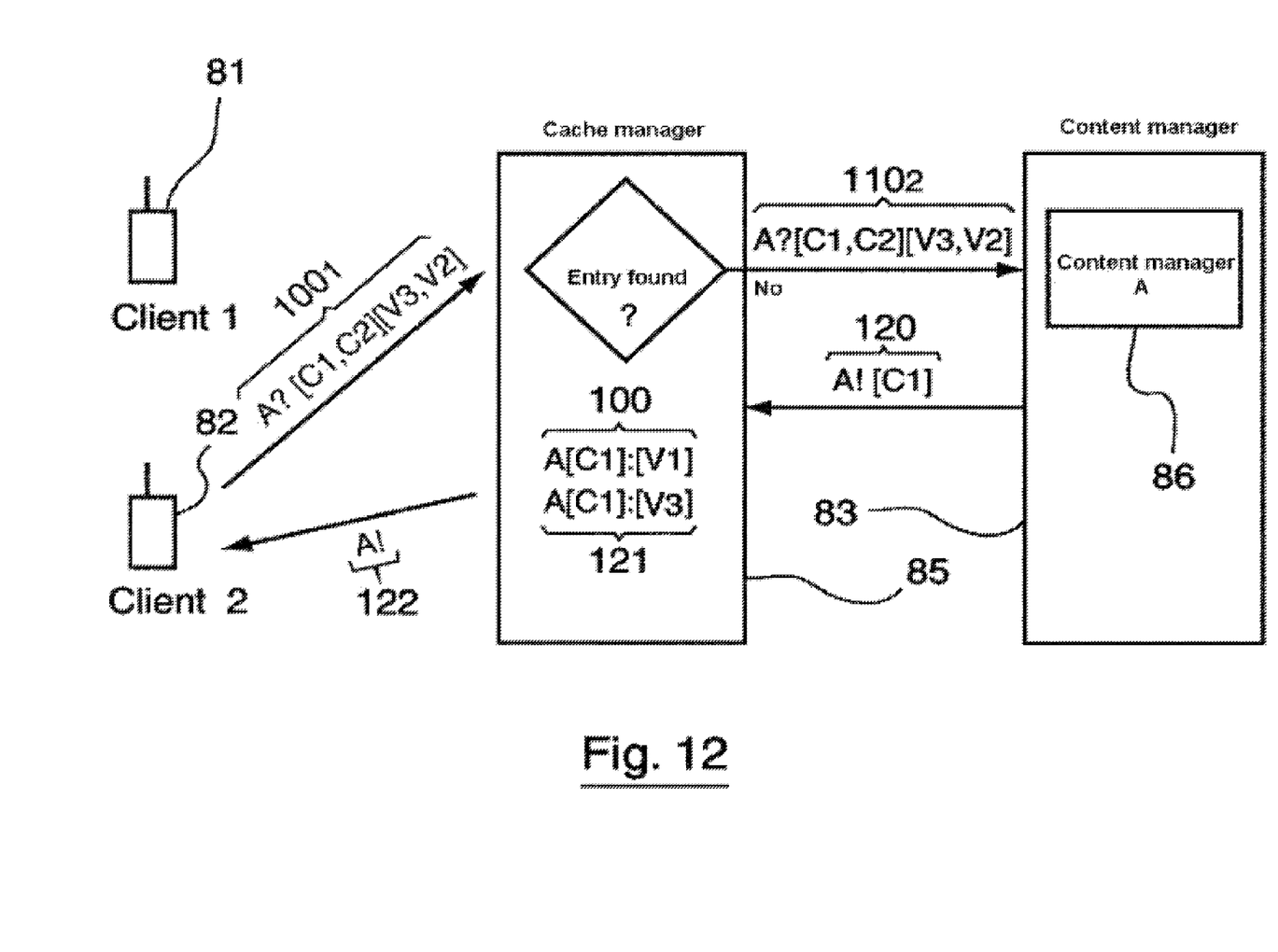
FIG. 12 shows a situation in which a second client terminal requests content not already present in the cache, the terminal itself determining the essential characteristic of the client for producing the dynamic content.

The content manager 86 generates the content A and, in order to do so, it needed the criterion C1, which it determined as being the sole criterion to be taken into account in order to generate the content, and it returns content 121 to the cache manager 85 by means of a request 120, as shown in FIG. 12.

The cache manager 85 then stores the new content A 121 generated with the criterion C1, for a predetermined and parameterable period of time, and retrieves the value V3 associated with C1 for the client terminal 82, before sending the requested content A 122 back to the client terminal 82.

3. Description of the General Principle of the Mechanism for Managing the Cache of a Server Terminal According to an Embodiment of the Invention, when a Combination of Characteristics is Necessary for Generating Content As shown in FIGS. 13 to 17, the case will now be discussed of two different client terminals not having any compatible characteristic and therefore not being capable of sharing the same cached content in the cache of the server terminal.

Furthermore, in this configuration, the content manager 134 will have to take account of and use different combinations of criteria in order to generate the content requested by the client terminals 130 and 131, respectively.

More precisely, in this new configuration capable of being advantageously taken into account by the method according to an embodiment of the invention, the client terminal 130 possesses the characteristics C1, C2 and the values V1, V2 for these characteristics, the client terminal 131 for its part possessing characteristics C1, C2 and possible values V3, V2 for these characteristics.

Figure 13:
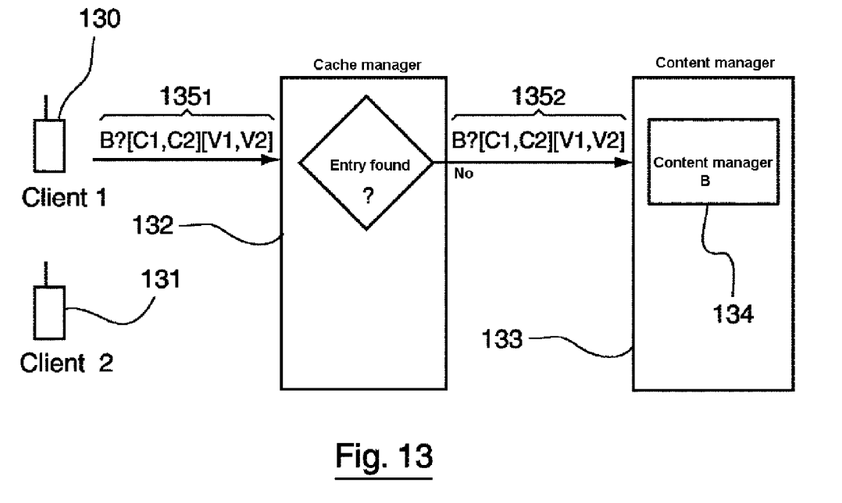
FIG. 13 gives a new example of a request transmitted by a client terminal for a new characteristic.
Figure 14:
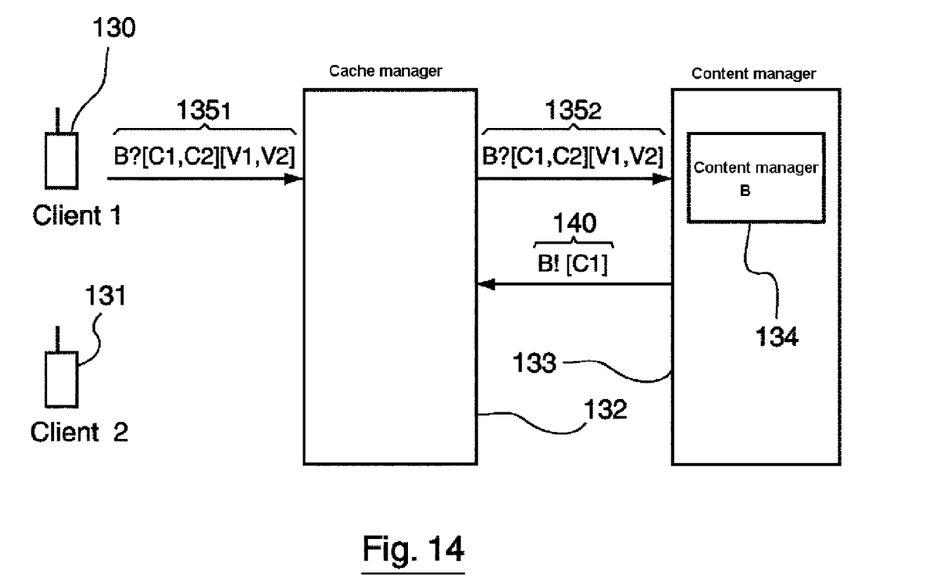
FIGS. 14 and 15 show the principle of determining the new essential characteristic and its associated value in response to the request of FIG. 13.

As shown by way of FIG. 13, the client terminal 130 sends out a request 135.sub.1 bound for the server terminal cache manager 132, in order to procure content B suited to its characteristics C1 and/or C2, with possible values V1 and/or V2, respectively. The cache manager 132 then looks to see if it possesses entries relating to the content B and, as it does not possess any in the example of FIG. 13, it transmits the request 135.sub.2 to the content manager 133, which manager 134 generates the requested content B, after having determining that it was imperative for the criterion C1 of the client terminal 130 to be taken into account in order to generate the content B, which it then transmits to the cache manager 132, by means of a request 140, as shown in FIG. 14.

Figure 15:
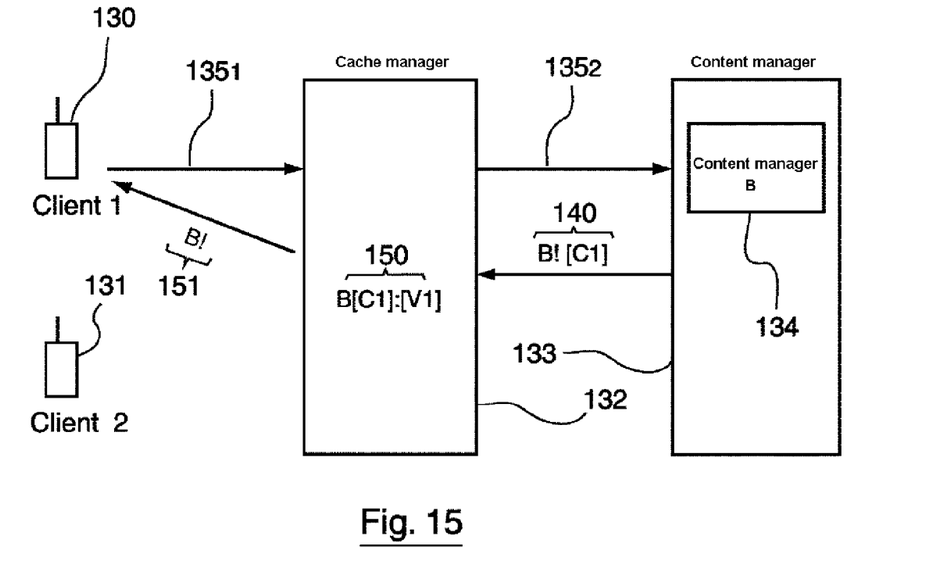

The cache manager 132 then stores the content B 150 with the criterion C1 and retrieves the value V1 associated with C1 for this client terminal 130, before sending the generated content 151 back to said terminal having requested it, as shown in FIG. 15.

Figure 16:
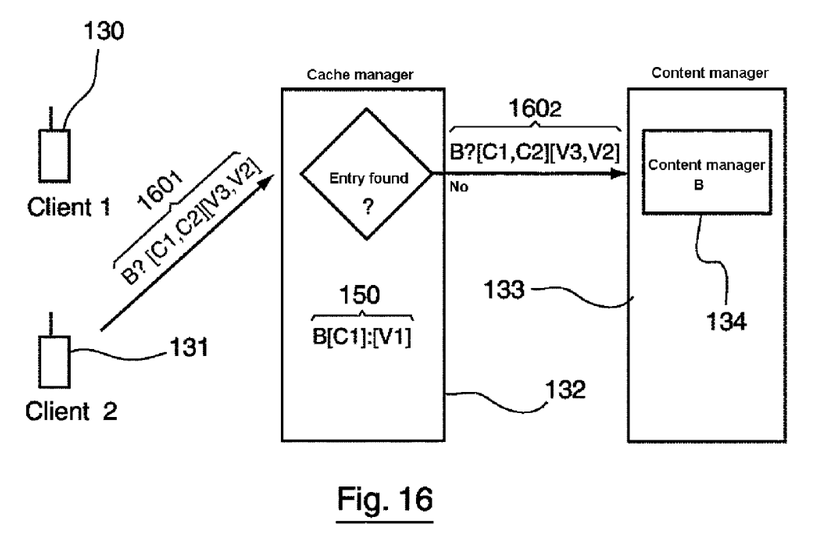
FIGS. 16 and 17 show the generation of a new dynamic page in the cache following a request from a second terminal, having required the determination of two new essential characteristics for generating and for determining the associated values.

When a client terminal 132 subsequently requests the same content B from the cache manager 132, by means of a request 160.sub.1, the manager 132 again looks to see if it possesses entries relating to B, which are compatible with the content of the request 160.sub.1. In the case of FIG. 16, it does not find any, the manager 132 having determined that, for the client terminal 131, it was necessary to consider the two characteristics C1 and C2 and their possible values V3 and V2, respectively, in order to adapt the requested content to the client terminal 131. As a result, and as shown in FIG. 16, the manager 132 sends the request 160.sub.2 back to the content manager 133, which returns the new generated content B to the cache manager 132 by means of a request 170, after taking account of the characteristics C1 and C2 in order to generate the content B to be returned to the client terminal 131.

Figure 17:
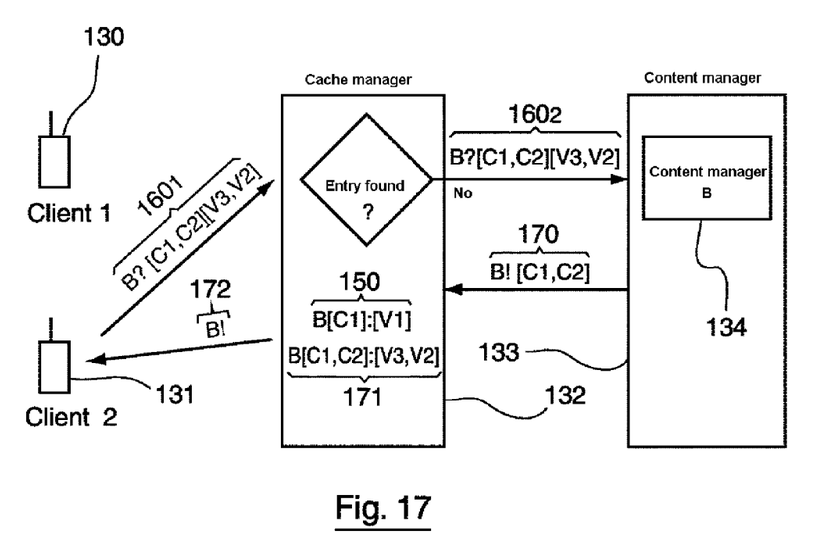

The cache manager 132 then stores the content B 171 with the criteria C1, C2 and retrieves the value V3, V2 associated with C1, C2 for this client terminal, before returning to it the content B 172, in the form of a request containing the content B generated for this client terminal.

FIG. 1 synthetically summarises all of these various aforesaid possibilities for optimising the cache of a server terminal, when client terminals request dynamic contents, e.g., multimedia, having to be suited to their own technical characteristics, without however requiring routine generation of the content, when the latter is already present in the cache and fully responds to various requests, even if the latter come from different client terminals, but possess common characteristics essential to the generation of requested content.

An exemplary embodiment provides a method making it possible to optimise the management of a cache of a dynamic page server terminal capable of being consulted via different types of client terminals.

An embodiment provides such a method, which does not require advance knowledge, as in the known techniques of the prior art, of the set of parameters to be placed in the cache of the server terminal, for a given type of client terminal at the origin of a request for a page or, more generally speaking, for dynamic content.

An embodiment provides such a method which permits a stronger degree of granularity of the cached elements, relative to the specific characteristics of a client terminal requesting consultation of dynamic pages.

An embodiment provides such a method which is entirely independent of the type of terminal and its specific technical characteristics, at the origin of a request, and which therefore permits processing of requests coming from mobile communication terminals (e.g., a mobile telephone or a personal digital assistant (PDA)), as well as requests coming from stationary terminals (e.g., a computer or a notebook PC).

An embodiment provides such a method which is easy to implement, and non-intensive in terms of time and computing power, while at the same time remaining reasonable in cost.

Although the present disclosure have been described with reference to one or more examples, workers skilled in the art will recognize that changes may be made in form and detail without departing from the spirit and scope of the disclosure and/or the appended claims.

The invention claimed is:

1. Method for optimising the management of a dynamic page server cache capable of being consulted via different types of client terminals, and consequently requiring distinct instances of a dynamic page in said cache, wherein when a terminal requests a dynamic page, the method implements a step of verifying the presence of at least one instance of said dynamic page in the cache, whereby if the verification is positive, the method implements the following additional steps:

procurement of a set of characteristics specific to the type of client terminal;
determination, from amongst the specific characteristics, of a subset of characteristics necessary for rendering said dynamic page on a client terminal;
searching for a possible instance amongst the at least one instance of said dynamic page in the cache, using the subset of necessary characteristics;
allocation of the possible instance to said client terminal;
wherein said cache is in the form of a table including, for each address of a dynamic page, at least one first list of entries containing at least one characteristic specific to the type of client terminal, and at least one second list of entries containing, for at least one of the characteristics of the first list, at least one valid cache value necessary for rendering said dynamic page on said client terminal;
wherein said step of verifying the presence of at least one instance of said dynamic page in said cache includes the following substeps of:
searching to see if, for the address of said dynamic page requested by said client terminal, at least one of said characteristics of said subset of characteristics specific to said client terminal is present in said first list of said cache entries;
and if at least one of said characteristics of said client terminal is found in said first list of entries:
searching to see if, for each of said characteristics of said subset of characteristics necessary for rendering said dynamic page requested by said terminal, there is at least one valid cache value in said second list of said cache entries;
and, if for said address of said requested dynamic page none of said characteristics of said subset of characteristics specific to said client terminal is present in said first list of entries, or if said step for searching for at least one valid cache value in said second list of said cache entries was without result in terms of said characteristics of said subset of characteristics necessary for rendering said dynamic page:
addition to said first list of entries of at least one characteristic of said subset of characteristics for said address of said dynamic page requested by said client, and
generation, in said second list of said cache entries, of at least one valid cache value for said at least one characteristic of said necessary subset of characteristics added to the first list;
wherein said client terminal transmits said characteristics of said subset of characteristics necessary for rendering said dynamic page to a predetermined hosting server terminal and transmits an address of said predetermined hosting server terminal to said dynamic page server, and said dynamic page server looks for said characteristics of said subset of characteristics specific to said client terminal on said predetermined hosting server terminal;
wherein said at least one first list of entries containing said at least one characteristic specific to the type of said client terminal includes a characteristic that corresponds to said client terminal's support of video, and said at least one second list of entries containing, for said characteristic in said first list, at least one valid cache value necessary for rendering said dynamic page on said client terminal includes a Boolean value indicating said client terminal's support for Mpeg-4.

2. Method for optimising the management of a dynamic page server cache of claim 1, wherein if said verification step is negative, the method implements the following additional steps:

generating at least one instance of said dynamic page in said cache for a subset of characteristics specific to the type of said client terminal;
allocating said generated instance to said client terminal.

3. Method for optimising the management of a dynamic page server cache as claimed in claim 1, wherein said distinct instances of a dynamic page are accessible in said cache for a predetermined period of time.

4. Method for optimising the management of a dynamic page server cache as claimed in claim 1, wherein said request for a dynamic page by said client terminal is taken into account by said dynamic page server after a preliminary positive identification step for the type of said client terminal by said dynamic page server.

5. Method for optimising the management of a dynamic page server cache as claimed in claim 1, wherein said characteristics of said subset of characteristics necessary for rendering said dynamic page on said client terminal are predetermined by said client terminal.

6. Method for optimising the management of a dynamic page server cache as claimed in claim 2, wherein for each instance of said dynamic page generated, all of the values of the characteristics used by said generated page, and calculated on the basis of said subset of characteristics specific to the type of said client terminal, are added to said cache.

7. Method for optimising the management of a dynamic page server cache as claimed in claim 2, wherein said step for generating at least one instance of said dynamic page in said cache includes a preliminary substep for determining at least one characteristic and at least one value of said characteristic, which are essential for said generating step.

8. Method for optimising the management of a dynamic page server cache as claimed in claim 1, wherein said dynamic pages are multimedia content pages including at least one piece of data including at least:
text;
images;
sound; and
video.

9. Method for optimising the management of a dynamic page server cache as claimed in claim 1, wherein said client terminals are of different types including at least:
mobile telecommunication terminals;
radiocommunication terminals;
stationary terminals; and
streaming terminals;
and said dynamic page server generating content comprises at least one of the:
stationary server type;
mobile server type; and
streaming server type.

10. Method for optimising the management of a dynamic page server cache as claimed in claim 1, wherein determining said subset of characteristics necessary for rendering said dynamic page on said client terminal includes determining a sole characteristic of said at least one of said characteristics of said subset of characteristics specific to said client terminal that is necessary for rendering said dynamic page on said client terminal.

11. Non-transitory computer readable medium including program instructions for performing a method of optimising the management of a dynamic page server cache capable of being consulted by different types of client terminals, and consequently requiring distinct instances of a dynamic page within said cache, wherein said method comprises:

when a terminal requests a dynamic page, verifying the presence of at least one instance of said dynamic page in said cache is implemented, so that, if verification is positive, the method implements the steps of:

procurement of a set of characteristics specific to the type of said client terminal;

determination, from amongst said specific characteristics, of a subset of characteristics necessary for rendering said dynamic page on a client terminal;

searching for a possible instance amongst said at least one instance of said dynamic page in said cache, using said subset of necessary characteristics;

allocation of said possible instance to said client terminal;

when said program is running on a computer;

wherein said cache is in the form of a table including, for each address of a dynamic page, at least one first list of entries containing at least one characteristic specific to the type of client terminal, and at least one second list of entries containing, for at least one of the characteristics of the first list, at least one valid cache value necessary for rendering said dynamic page on said client terminal;

wherein said verifying the presence of at least one instance of said dynamic page in said cache includes the following substeps of:

searching to see if, for the address of said dynamic page requested by said client terminal, at least one of said characteristics of said subset of characteristics specific to said client terminal is present in said first list of said cache entries;

and if at least one of said characteristics of said client terminal is found in said first list of entries:

searching to see if, for each of said characteristics of said subset of characteristics necessary for rendering said dynamic page requested by said terminal, there is at least one valid cache value in said second list of said cache entries;

and, if for said address of said requested dynamic page none of said characteristics of said subset of characteristics specific to said client terminal is present in said first list of entries, or if said step for searching for at least one valid cache value in said second list of said cache entries was without result in terms of said characteristics of said subset of characteristics necessary for rendering said dynamic page:

addition to said first list of entries of at least one characteristic of said subset of characteristics for said address of said dynamic page requested by said client, and generation, in said second list of said cache entries, of at least one valid cache value for said at least one characteristic of said necessary subset of characteristics added to the first list;

wherein said client terminal transmits said characteristics of said subset of characteristics necessary for rendering said dynamic page to a predetermined hosting server terminal and transmits an address of said predetermined hosting server terminal to said dynamic page server, and said dynamic page server looks for said characteristics of said subset of characteristics specific to said client terminal on said predetermined hosting server terminal;

wherein said at least one first list of entries containing said at least one characteristic specific to the type of said client terminal includes a characteristic that corresponds to said client terminal's support of video, and said at least one second list of entries containing, for said characteristic in said first list, at least one valid cache value necessary for rendering said dynamic page on said client terminal includes a Boolean value indicating said client terminal's support for Mpeg-4.

12. Non-transitory computer program including program instructions for optimising the management of a dynamic page server cache of claim 11 wherein if said verification is negative, the following steps are implemented for:

generating at least one instance of said dynamic page in said cache for a subset of characteristics specific to the type of said client terminal;

allocating said generated instance to said client terminal;

when said program is running on a computer.

13. Device for optimising the management of a dynamic page server cache being consulted by different types of client terminals, and consequently requiring distinct instances of a dynamic page within said cache, wherein the device comprises:

a dynamic page server terminal for:

verifying the presence of at least one instance of said dynamic page in said cache when a client terminal requests a dynamic page;

procuring a set of characteristics specific to the type of said client terminal;

determining, from amongst said specific characteristics, a set of values for said subset of characteristics necessary for rendering said dynamic page on a client terminal;

searching for a possible instance amongst said at least one instance of said dynamic page in said cache, using said subset of necessary characteristics;

allocating said possible instance to said client terminal; and generating at least one instance of said dynamic page in said cache for said set of values of said subset of characteristics specific to the type of said client terminal;

so that, if at least one instance of said dynamic page is present in said cache, said allocation allocates said instance of said dynamic page to said client terminal requesting said instance of said dynamic page and, if no instance of said dynamic page is present in said cache, said generating generates at least one instance of said page requested in said cache for a subset of characteristics specific to said client terminal;

wherein said cache is in the form of a table including, for each address of a dynamic page, at least one first list of entries containing at least one characteristic specific to the type of client terminal, and at least one second list of entries containing, for at least one of the characteristics of the first list, at least one valid cache value necessary for rendering said dynamic page on said client terminal;

wherein said verifying the presence of at least one instance of said dynamic page in said cache includes the following substeps of:

searching to see if, for the address of said dynamic page requested by said client terminal, at least one of said characteristics of said subset of characteristics specific to said client terminal is present in said first list of said cache entries;

and if at least one of said characteristics of said client terminal is found in said first list of entries:
  searching to see if, for each of said characteristics of said subset of characteristics necessary for rendering said dynamic page requested by said terminal, there is at least one valid cache value in said second list of said cache entries;

and, if for said address of said requested dynamic page none of said characteristics of said subset of characteristics specific to said client terminal is present in said first list of entries, or if said step for searching for at least one valid cache value in said second list of said cache entries was without result in terms of said characteristics of said subset of characteristics necessary for rendering said dynamic page:
  addition to said first list of entries of at least one characteristic of said subset of characteristics for said address of said dynamic page requested by said client, and
  generation, in said second list of said cache entries, of at least one valid cache value for said at least one characteristic of said necessary subset of characteristics added to the first list;

wherein said client terminal transmits said characteristics of said subset of characteristics necessary for rendering said dynamic page to a predetermined hosting server terminal and transmits an address of said predetermined hosting server terminal to said dynamic page server, and said dynamic page server looks for said characteristics of said subset of characteristics specific to said client terminal on said predetermined hosting server terminal;

wherein said at least one first list of entries containing said at least one characteristic specific to the type of said client terminal includes a characteristic that corresponds to said client terminal's support of video, and said at least one second list of entries containing, for said characteristic in said first list, at least one valid cache value necessary for rendering said dynamic page on said client terminal includes a Boolean value indicating said client terminal's support for Mpeg-4.

14. Dynamic page server generating content, wherein the server includes the device of claim 13, ensuring optimisation of the management of at least one cache of said dynamic page server capable of being consulted by different types of mobile terminals, and consequently requiring distinct instances of a dynamic page within said cache.

\* \* \* \* \*